United States Patent
Sammut (10) Patent No.: US 9,723,772 B2
(45) Date of Patent: Aug. 8, 2017

(54) SOD HARVESTER WITH SOD ROLL ACCUMULATOR SQUEEZE DEVICE

(71) Applicant: Trebro Holding, Inc., Billings, MT (US)

(72) Inventor: Daniel Sammut, Freemans Reach (AU)

(73) Assignee: Trebro Holding, Inc., Billings, MT (US)

( * ) Notice: Subject to any disclaimer, the term of this patent is extended or adjusted under 35 U.S.C. 154(b) by 957 days.

(21) Appl. No.: 14/064,128

(22) Filed: Oct. 26, 2013

(65) Prior Publication Data

US 2015/0114240 A1    Apr. 30, 2015

(51) Int. Cl.
*A01B 45/04* (2006.01)
*B30B 3/02* (2006.01)

(52) U.S. Cl.
CPC .............. *A01B 45/045* (2013.01); *B30B 3/02* (2013.01)

(58) Field of Classification Search
CPC .... A01B 45/045; A01D 43/06; A01D 43/006; B30B 3/02
USPC ............. 195/35 A; 414/24.5, 111; 193/35 A; 100/35, 210
See application file for complete search history.

(56) References Cited

U.S. PATENT DOCUMENTS

| | | | |
|---|---|---|---|
| 3,066,828 A * | 12/1962 | Blake | B65G 47/29 193/35 A |
| 4,004,701 A * | 1/1977 | Moses | B65G 1/08 221/295 |
| 4,136,763 A * | 1/1979 | Pryor | B65G 47/8823 144/248.5 |
| 4,966,239 A * | 10/1990 | Hutchison | A01B 45/045 172/20 |
| 5,230,602 A * | 7/1993 | Schouten | A01B 45/045 414/789.7 |
| 5,690,461 A * | 11/1997 | Tilley | A01D 90/08 414/111 |
| 5,697,760 A | 12/1997 | Rosen | |
| 6,296,063 B1 | 10/2001 | Tvetene et al. | |
| 6,364,027 B1 | 4/2002 | Tvetene et al. | |
| 6,681,864 B2 | 1/2004 | Tvetene et al. | |
| 6,783,318 B2 | 8/2004 | Tvetene et al. | |
| 7,111,721 B1 * | 9/2006 | Turner | B65G 47/8823 193/35 A |

* cited by examiner

*Primary Examiner* — Jimmy T Nguyen
*Assistant Examiner* — Gregory Swiatocha
(74) *Attorney, Agent, or Firm* — Antoinette M. Tease (57) ABSTRACT

A sod harvester having a sod roll accumulator squeeze device configured to compact a sod roll while it is on a horizontal conveyor before it is picked up and moved by a sod carrier from a first location on the horizontal conveyor to a second location. The sod roll accumulator squeeze device is pivotally attached to a frame and controlled by a hydraulic cylinder that moves the accumulator squeeze device between an up position and a down position. The present invention is also a method of compacting a sod roll while it is at a first location on a horizontal conveyor of a sod harvester before it is moved by a sod carrier to a second location. The method includes providing an accumulator squeeze device that is pivotally attached to a frame and configured to compact the sod roll from the rear end of the sod harvester.

3 Claims, 11 Drawing Sheets

SOD HARVESTER WITH SOD ROLL ACCUMULATOR SQUEEZE DEVICE

BACKGROUND OF THE INVENTION

1. Field of the Invention

The present invention relates generally to the field of sod harvesters, and more specifically, to a device for squeezing laterally (or compacting) the first sod roll in a group of sod rolls on a horizontal conveyor before they are picked up by a sod carrier and deposited onto a pallet.

2. Description of the Related Art

In some countries, the transport width of vehicles hauling sod rolls is tightly regulated. Failure to comply with such regulations may result in the imposition of fines. Even in countries that do not regulate transport width as tightly, the appearance of the sod rolls on the pallets is an important factor in salability. The present invention addresses both of these problems by compacting (or squeezing) the first sod rod in a group of sod rolls as they are picked up by the sod carrier and deposited onto a pallet prior to transportation. This act of squeezing the first sod roll ensures that the outward-facing sod rolls on the pallet are compact and neat in appearance.

To the best of the inventor's knowledge, there are no devices in existence or previously in existence that provide the same functionality as the present invention, nor are there any prior art references that describe such devices. Examples of patents that address various other types of improvements to sod harvesters include U.S. Pat. No. 4,966,239 (Hutchison 1990); U.S. Pat. No. 5,697,760 (Rosen, 1997); U.S. Pat. No. 6,296,063 (Tvetene et al., 2001); U.S. Pat. No. 6,364,027 (Tvetene et al., 2002); U.S. Pat. No. 6,681,864 (Tvetene et al., 2004); and U.S. Pat. No. 6,783,318 (Tvetene et al., 2004). U.S. Pat. No. 4,004,701 (Moses, 1977) involves a dispensing system apparatus for storing and dispensing cylindrical objects.

BRIEF SUMMARY OF THE INVENTION

The present invention is a sod harvester comprising a sod roll accumulator squeeze device that is configured to compact a sod roll while it is on a horizontal conveyor before the sod roll is picked up and moved by a sod carrier from a first location on the horizontal conveyor to a second location not on the horizontal conveyor. In a preferred embodiment, the sod roll accumulator squeeze device is pivotally attached to a frame of the sod harvester and controlled by a hydraulic cylinder, and the hydraulic cylinder moves the accumulator squeeze device between an up position and a down position. Preferably, the sod roll accumulator squeeze device comprises a first leg that is pivotally attached to a frame of the sod harvester, a second leg that is joined to the first leg at a ninety-degree angle, a third leg that is joined to the second leg at a ninety-degree angle and that is parallel to the first leg, and a squeeze member that extends laterally from the third leg, and the third leg is shorter than the first leg.

In a preferred embodiment, the second leg has a length, the sod roll has a center, and the length of the second leg is configured to position the squeeze member roughly in the center of the sod roll when the accumulator squeeze device is in an up position. Preferably, the third leg has a length relative to a length of the first leg, and the length of the third leg relative to the length of the first leg is configured to provide a desired amount of tension on the sod roll when the accumulator squeeze device is in an up position.

The present invention is also a method of compacting a sod roll while it is at a first location on a horizontal conveyor of a sod harvester before it is moved by a sod carrier to a second location not on the horizontal conveyor, the sod harvester having a rear end, the method comprising providing an accumulator squeeze device that is pivotally attached to a frame of the sod harvester and configured to compact the sod roll from the rear end of the sod harvester.

REFERENCE NUMBERS

1 Sod carrier
2 Horizontal conveyor belt
3 Sod roll
4 Accumulator squeeze device
5 First leg (of accumulator squeeze device)
6 Second leg (of accumulator squeeze device)
7 Third leg (of accumulator squeeze device)
8 Squeeze member
9 Hydraulic cylinder
10 Pivot-point
11 Bracket

DETAILED DESCRIPTION OF INVENTION

Figure 1:
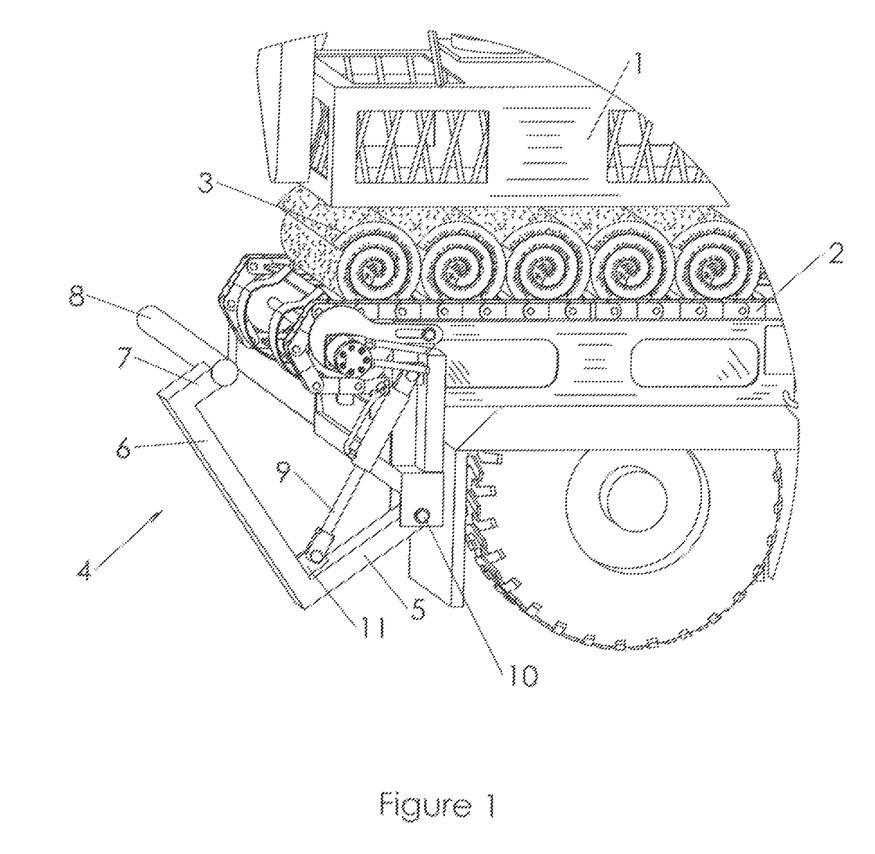
FIG. 1 is a first perspective view of the present invention shown with the accumulator squeeze device in a down position.

FIG. 1 is a first perspective view of the present invention shown with the accumulator squeeze device in a down position. The sod harvester comprises a sod carrier 1 and a horizontal conveyor bed 2. An inclined conveyor belt (not shown) deposits the sod rolls 3 onto the horizontal conveyor belt 2. As the sod harvester moves forward (which, in this case, would be to the right of FIG. 1), a sod cutting knife (not shown) cuts pieces of sod from the ground and deposits them onto one or more inclined conveyors, where the pieces of sod are rolled into the configurations shown in FIG. 1. Note that the end flop is preferably at the 10:00 position, as shown in FIG. 1 and described in U.S. patent application Ser. No. 13/946,956 filed on Jul. 19, 2013.

As shown in FIG. 1, the sod carrier 1 is maintained in a first position directly above the horizontal conveyor 2 until a certain number (in this case, five) of sod rolls 3 have been deposited onto the horizontal conveyor. At that point, the sod carrier 1 moves vertically downward and picks up the sod rolls 3 with clamps, hooks or spears (not shown) extending from the bottom of the sod carrier. The sod carrier 1 then moves vertically upward and laterally away from the horizontal conveyor 2 to a second position that is directly above a pallet or other platform. The sod carrier 1 then releases the sod rolls 3, which are deposited onto the pallet. These steps are illustrated in subsequent figures.

The sod harvester of the present invention comprises a sod roll accumulator squeeze device 4 that squeezes laterally the first sod roll in the group of sod rolls on the horizontal conveyor just before the sod carrier 1 picks them up. In a preferred embodiment, the accumulator squeeze device 4 comprises a first leg 5 that is pivotally attached to the frame of the sod harvester at a pivot point 10. The accumulator squeeze device 4 further composes a second leg 6 that joins the first leg 5 at a ninety (90)-degree angle and a third leg 7 that joins the second leg at a ninety (90)-degree angle and that is parallel to the first leg 5. The third leg 7 is preferably shorter than the first leg 5.

A squeeze member 8 extends laterally from the terminal end (i.e., the end not joined to the second leg) of the third leg 7. The squeeze member 8 is preferably at least as long as the sod rolls 3 are wide (see FIG. 3). The first, second and third legs 5, 6, 7 of the accumulator squeeze device 4 are preferably positioned to one side or the other of the horizontal conveyor 2 (see FIG. 3). The length of the second leg 6 is configured to position the squeeze member 8 roughly in the center of the sod roll 3 when the accumulator squeeze device 4 is in an up position (see FIGS. 5 and 6). The relative lengths of the first and second legs 5, 7 are configured to provide the desired amount of squeeze or tension on the first sod roll 3 when the accumulator squeeze device 4 is in an up position.

A hydraulic cylinder 9 moves the accumulator squeeze device 4 from a down position to an up position and vice versa. The hydraulic cylinder 9 is connected on one end to the frame of the sod harvester and on the other end to a bracket 11 extending from the inside of the second leg 6. Both ends of the hydraulic cylinder 9 are pivot points. Movement of the hydraulic cylinder 9 is controlled by a controller (not shown). The controller is embedded with software that times the retraction and extension of the hydraulic cylinder so that the accumulator squeeze device 4 moves into an up position immediately prior to the sod carrier 1 moving vertically downward to pick up the sod rolls 3 and moves back into a down position after the sod carrier moves laterally from the first position (directly above the horizontal conveyor 2) to the second position (above the pallet).

Figure 2:
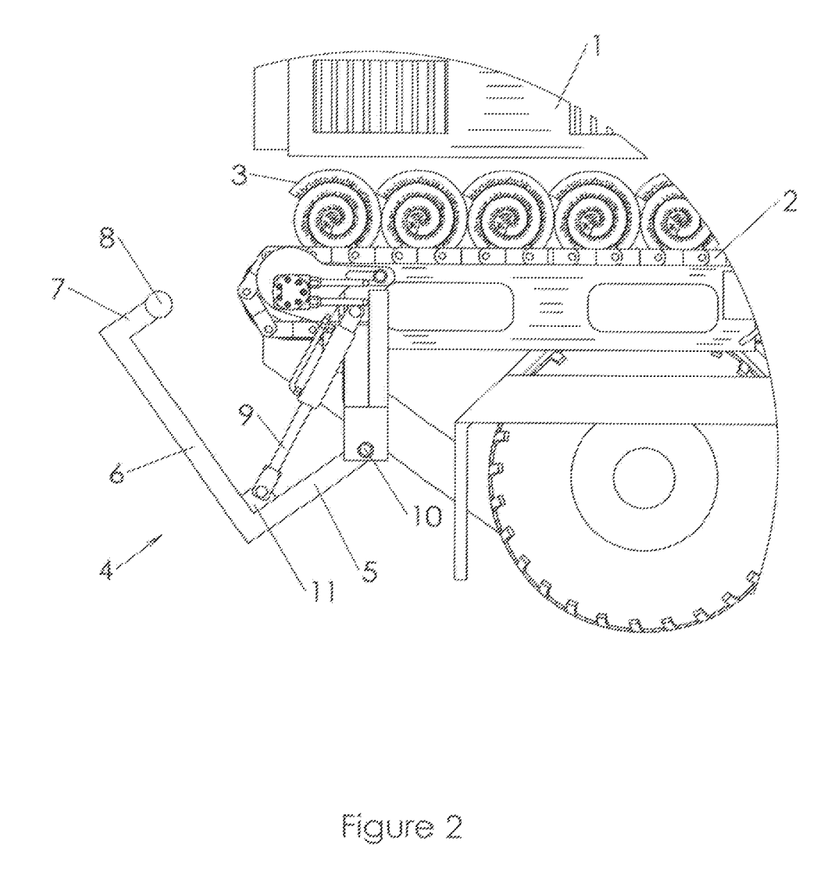
FIG. 2 is a side view of the present invention shown with the accumulator squeeze device in a down position.

FIG. 2 is a side view of the present invention shown with the accumulator squeeze device in a down position. At this juncture, the sod carrier 1 and accumulator squeeze device 4 are waiting for the requisite number (in this case, five of sod rolls 3 to be deposited onto the horizontal conveyor 2 before the accumulator squeeze device 4 moves into an up position and the sod carrier 1 moves vertically downward to pick up the sod rolls 3.

Figure 3:
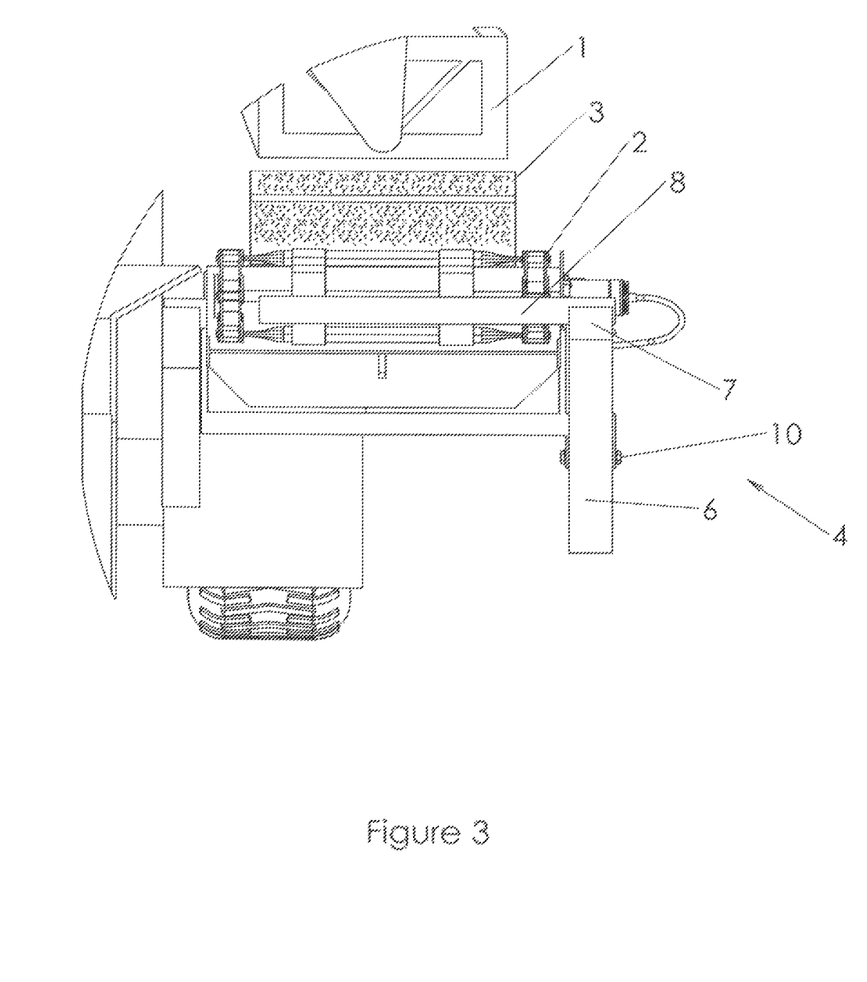
FIG. 3 is a rear view of the present invention shown with the accumulator squeeze device in a down position.

FIG. 3 is a rear view of the present invention shown with the accumulator squeeze device in a down position. As noted above, the squeeze member 8 is preferably at least as long as the sod rolls 3 are wide. When the accumulator squeeze device 4 is in a down position, the squeeze member 8 is preferably roughly on the same horizontal plane as the horizontal conveyor 2, as shown in this figure. Although the squeeze member 8 is depicted as a tube in the figures, the present invention is not limited to any particular shape (e.g., square or round) of the squeeze member as long as it accomplishes the function of squeezing the first sod roll 1 on the horizontal conveyor 2.

Figure 4:
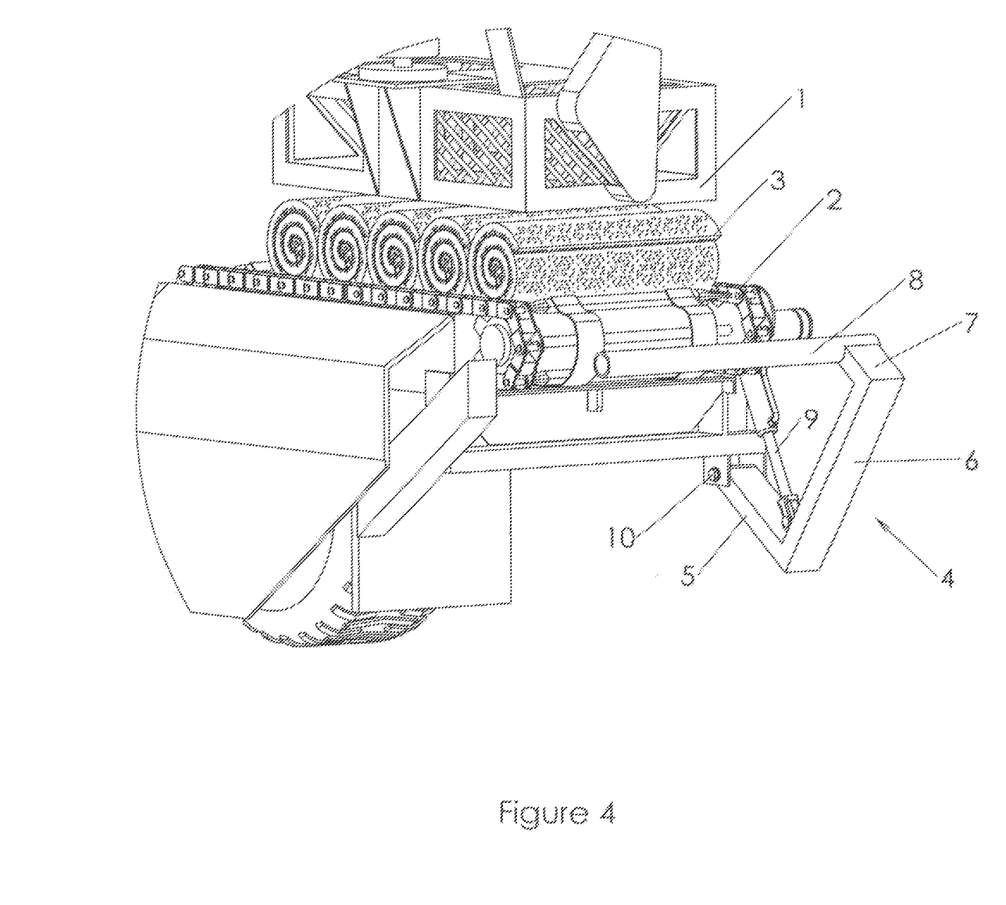
FIG. 4 is a second perspective view of the present invention shown with the accumulator squeeze device in a down position.

FIG. 4 is a second perspective view of the present invention shown with the accumulator squeeze device in a down position. In this particular embodiment, five sod rolls have been deposited onto the horizontal conveyor 2 by an inclined conveyor (not shown). The sod carrier 2 is now ready to move vertically downward to pick up the sod rolls 3.

Figure 5:
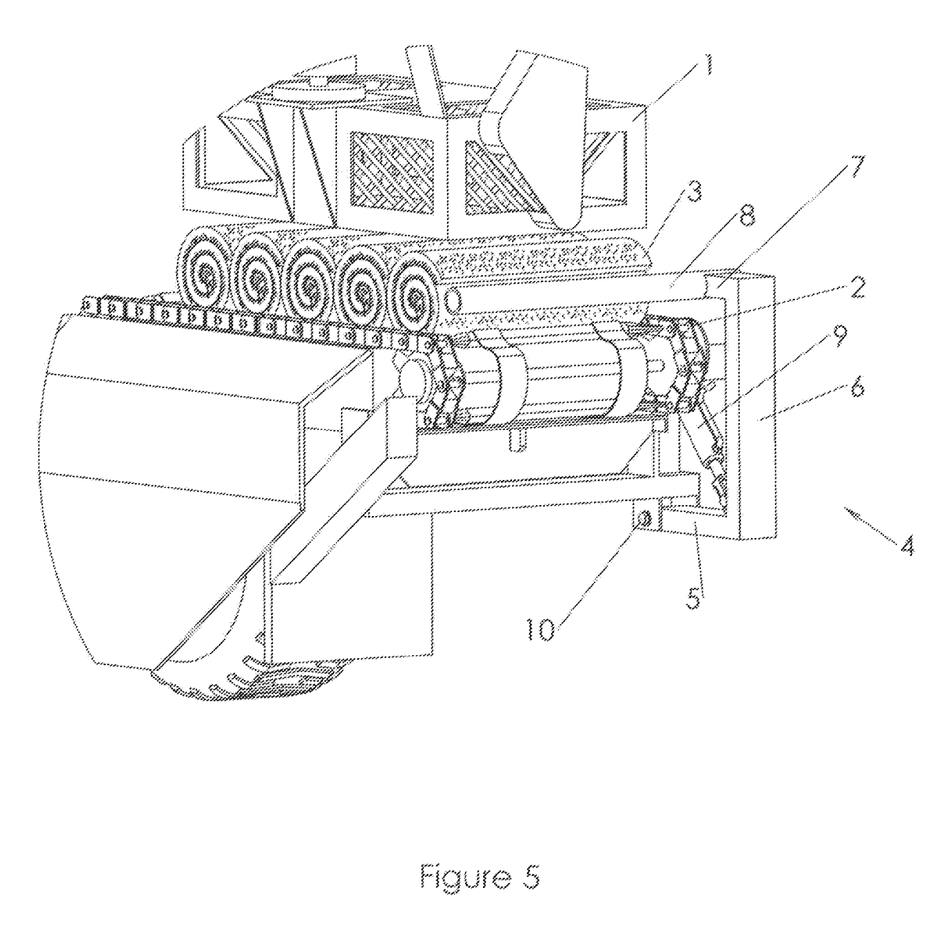
FIG. 5 is a perspective view of the present invention shown with the accumulator squeeze device in an up position and the sod carrier in an up position.

FIG. 5 is a perspective view of the present invention shown with the accumulator squeeze device in an up position and the sod carrier in an up position. As explained above, immediately prior to the sod carrier 2 moving vertically downward to pick up the sod rolls 3, the accumulator squeeze device 4 moves into an up position. This position is shown in FIG. 5.

Figure 6:
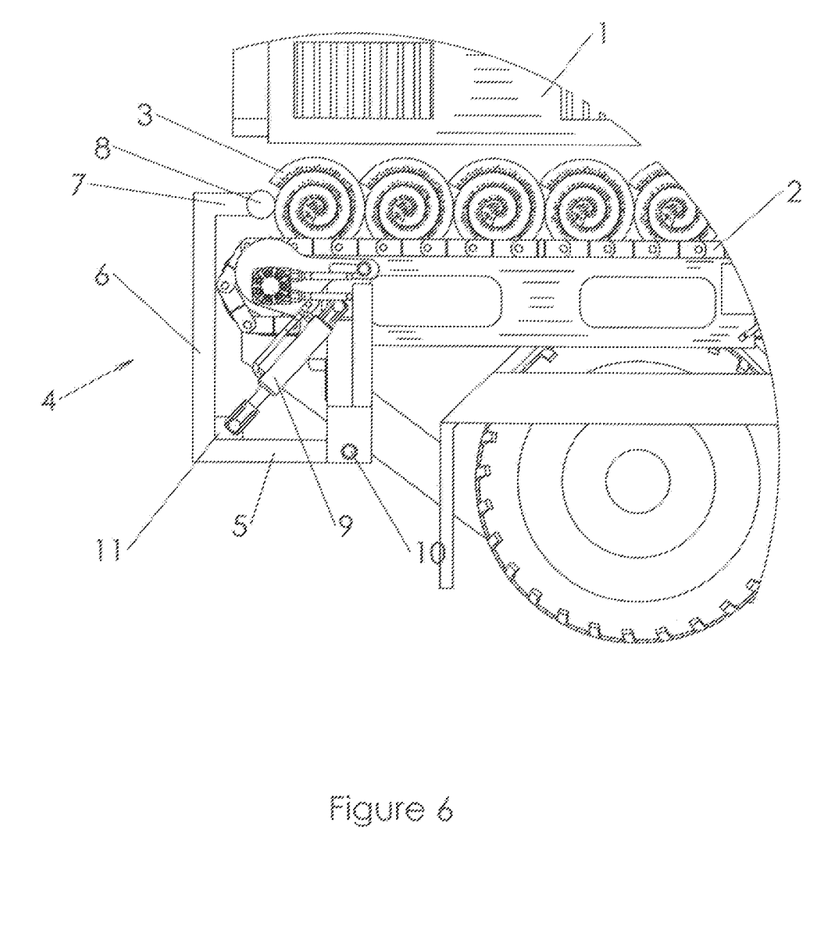
FIG. 6 is a side view of the present invention shown with the accumulator squeeze device in an up position and the sod carrier in an up position.

FIG. 6 is a side view of the present invention shown with the accumulator squeeze device in an up position and the sod carrier in an up position. This is a side view of the same stage shown in FIG. 5. At this stage, the squeeze member 8 is positioned to provide lateral counter-tension to the first sod roll 3 when the sod carrier 1 moves vertically downward to pick if up. In other words, the squeeze member 8 acts to compact the first sod roll 3 from the rear before it is moved away by the sod carrier 1.

Figure 7:
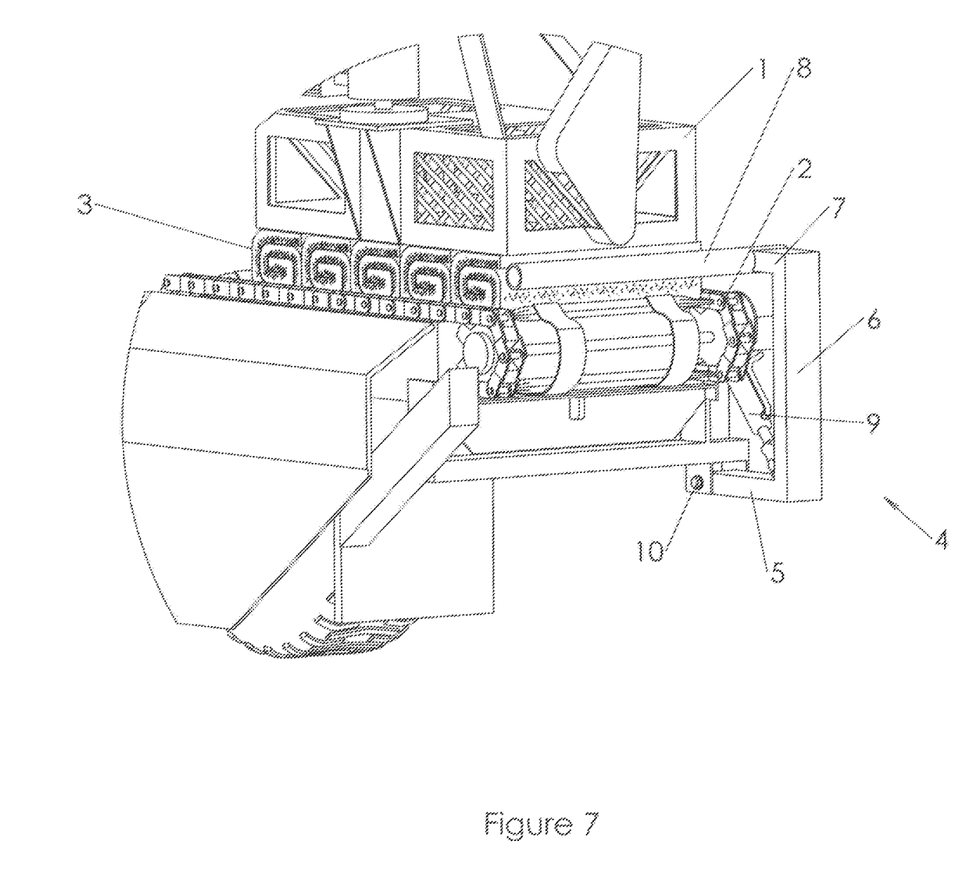
FIG. 7 is a perspective view of the present invention shown with the accumulator squeeze device in an up position and the sod carrier in a down position.
Figure 8:
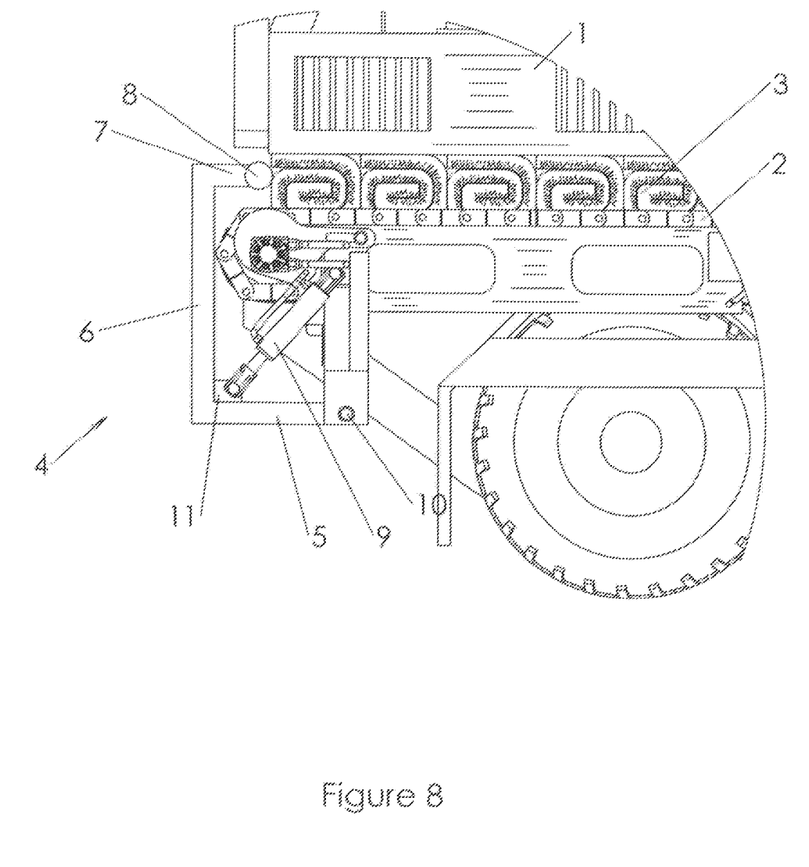
FIG. 8 is a side view of the present invention shown with the accumulator squeeze device in an up position and the sod carrier in a down position.

FIG. 7 is a perspective view of the present invention shown with the accumulator squeeze device in an up position and the sod carrier in a down position. At this stage, the sod carrier 1 is exerting a certain amount of downward pressure on the sod rolls 3, and the squeeze member 8 counters this pressure on the first sod roll by preventing it from expand laterally. FIG. 8 is a side view of the present invention shown with the accumulator squeeze device in an up position and the sod carrier in a down position.

Figure 9:
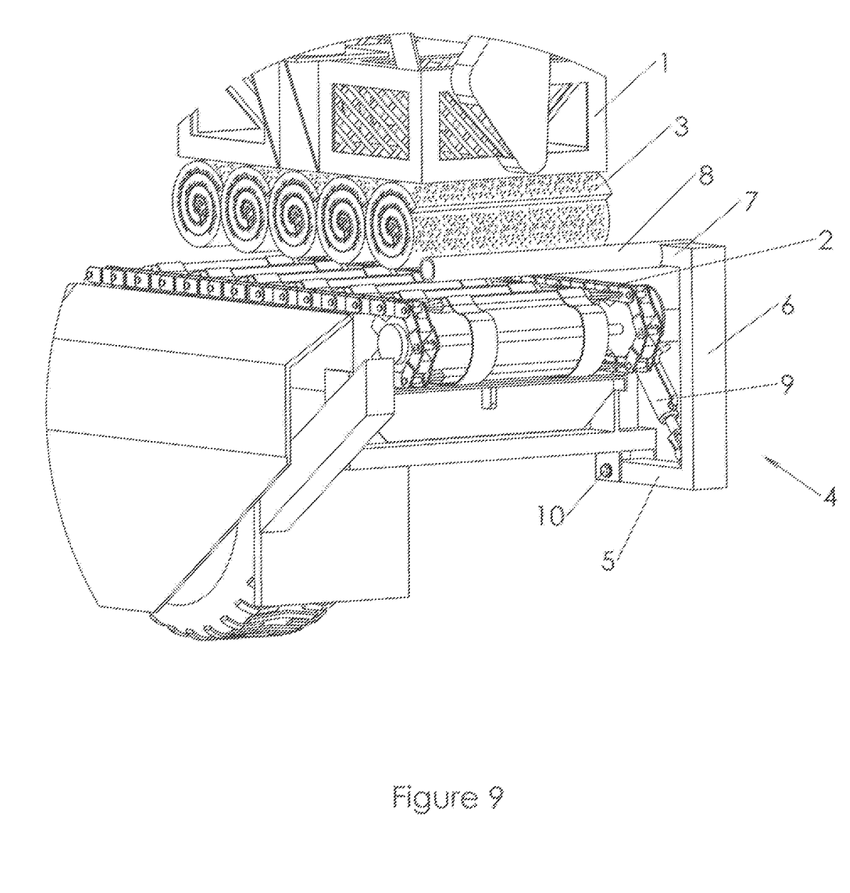
FIG. 9 is a perspective view of the present invention shown with the accumulator squeeze device in an up position and the sod carrier in an up position with the sod rolls secured to it.
Figure 10:
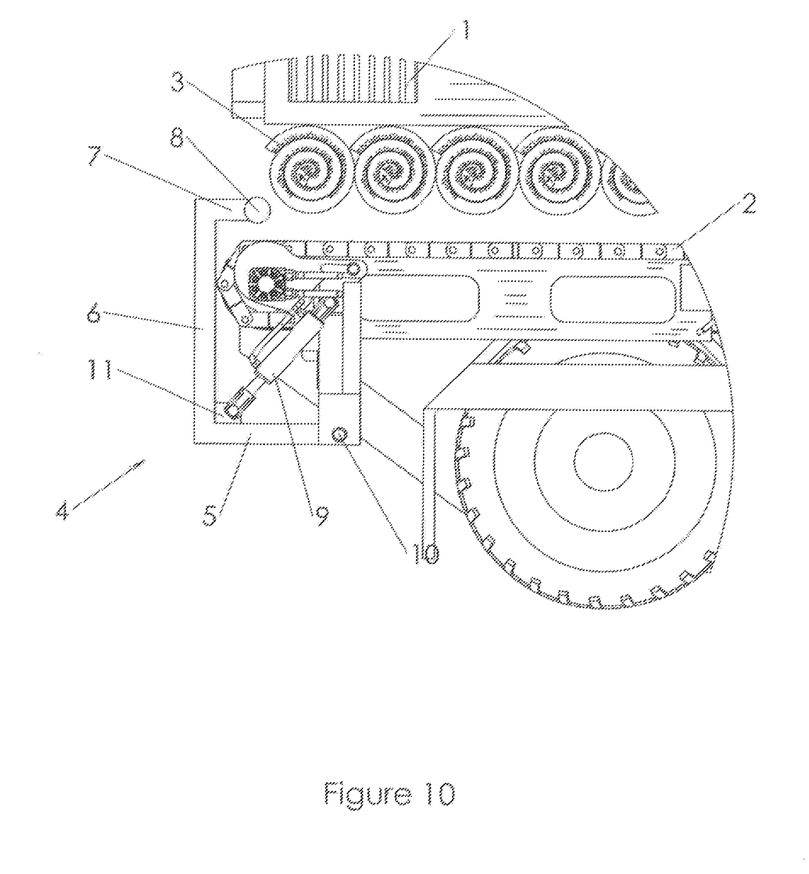
FIG. 10 is a side view of the present invention shown with the accumulator squeeze device in an up position and the sod carrier in an up position with the sod rolls secured to it.

FIG. 9 is a perspective view and FIG. 10 is a side view of the present invention shown with the accumulator squeeze device in an up position and the sod carrier in an up position with the sod rolls secured to it. At this stage, the sod rolls 3 have been secured to the sod carrier 1, which has moved vertically upward and is prepared to move laterally to deposit the sod rolls 3 onto a pallet. Note that the accumulator squeeze device 4 is still in an up position.

Figure 11:
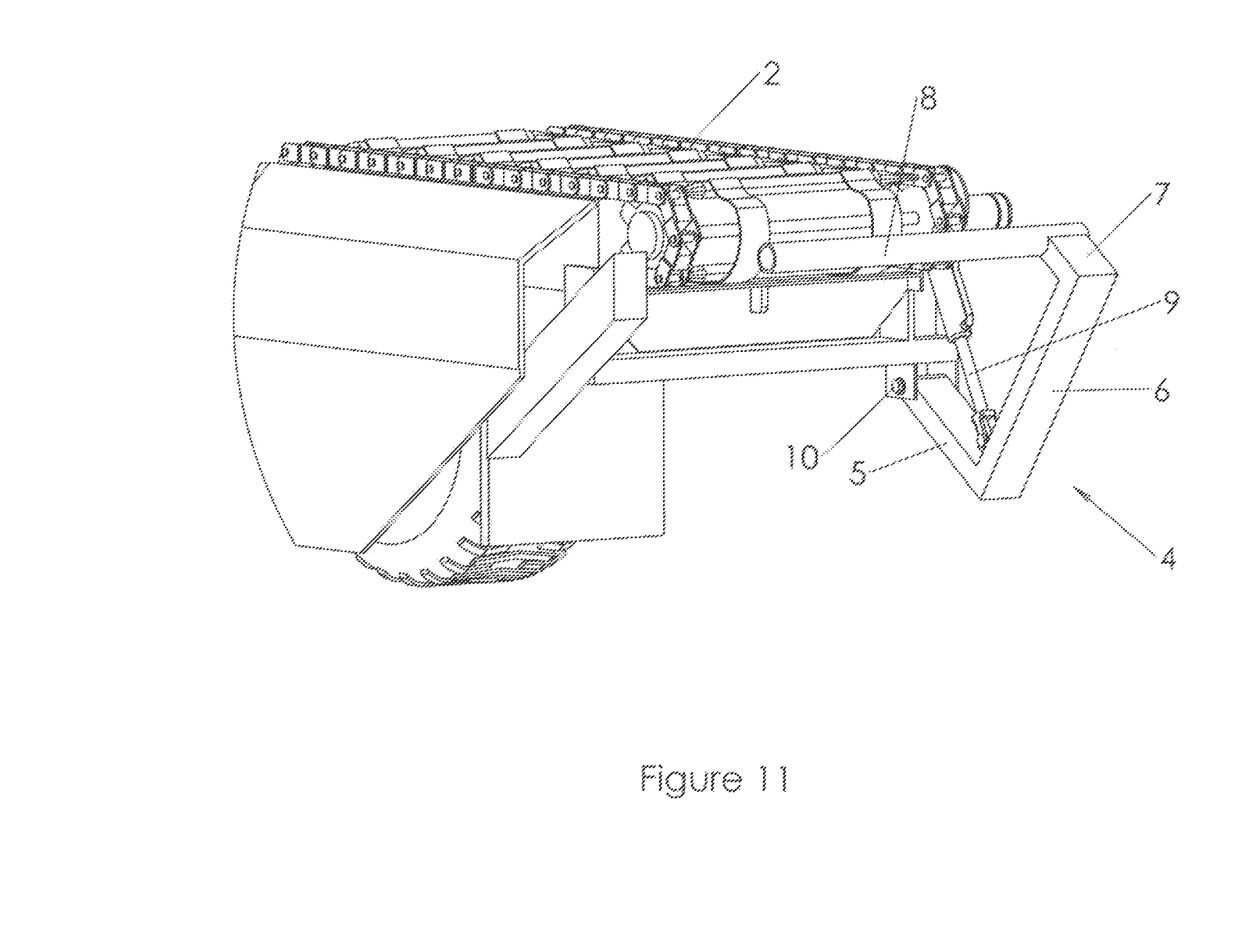
FIG. 11 is a perspective view of the present invention shown with the accumulator squeeze device in a down position after the sod carrier has moved laterally to deposit the sod rolls onto the pallet.

FIG. 11 is a perspective view of the present invention shown with the accumulator squeeze device in a down position after the sod carrier has moved laterally to deposit the sod rolls onto the pallet. In a preferred embodiment, the accumulator squeeze device 4 remains in an up position until the sod carrier 1 has moved to its second position directly above the pallet, at which point the accumulator squeeze device 4 moves back into a down position. The sod carrier 1 deposits the sod rolls 3 onto the pallet and moves back into its first position as shown in FIG. 4. The sod carrier 1 and accumulator squeeze device 4 wait for the requisite number of sod rolls 3 to be deposited onto the horizontal conveyor 2, and the process reiterates as described above.

It is important to note that the force being applied by the accumulator squeeze device in the present invention is in a direction opposite to the direction in which the horizontal conveyor moves when it is rotating. In other words, the horizontal conveyor rotates in a direction from the front of the sod harvester to the rear of the sod harvester, whereas the accumulator squeeze device applies force from the rear of the sod harvester toward the front of the sod harvester. In addition, as shown in the figures, the accumulator squeeze device applies pressure along virtually the entire longitudinal length of the sod roll as opposed to other devices that might apply pressure to the lateral ends of the sod roll. Another important feature of the present invention is that the accumulator squeeze device is retracted when the sod rolls are in the process of accumulating on the horizontal conveyor and does not move into an extended (or "up") position until all five sod rolls are positioned on the horizontal conveyor.

Although the preferred embodiment of the present invention has been shown and described, it will be apparent to those skilled in the art that many changes and modifications may be made without departing from the invention in its broader aspects. The present invention is expressly intended to cover any mechanism for compacting sod rolls from the rear before they are picked up and moved by the sod carrier. The appended claims are therefore intended to cover all such changes and modifications as fall within the true spirit and scope of the invention.

I claim:

1. A sod harvester comprising a horizontal conveyor that moves in a first direction, a movable sod carrier, and a sod roll accumulator squeeze device that is configured to compact a sod roll while it is on the horizontal conveyor before the sod roll is picked up and moved by the sod carrier from a first location on the horizontal conveyor to a second location not on the horizontal conveyor;

wherein the sod roll accumulator squeeze device is configured to squeeze laterally a first sod roll in a group of sod rolls on the horizontal conveyor;

wherein the sod roll accumulator squeeze device is pivotally attached to a frame of the sod harvester and controlled by a hydraulic cylinder, and wherein the hydraulic cylinder moves the accumulator squeeze device between an up position and a down position;

wherein the sod roll accumulator squeeze device comprises a first leg that is pivotally attached to a frame of the sod harvester, a second leg that is joined to the first leg at a ninety-degree angle, a third leg that is joined to the second leg at a ninety-degree angle and that is parallel to the first leg, and a squeeze member that extends laterally from the third leg, wherein the third leg is shorter than the first leg;

wherein the squeeze member pivots toward the first sod roll;

wherein the squeeze member is as long as the first sod roll is wide;

wherein the first sod roll has a longitudinal length, and the squeeze member applies pressure along the entire longitudinal length of the first sod roll;

wherein the squeeze member is aligned horizontally with the horizontal conveyor when the squeeze member is in a down position;

wherein the squeeze member compacts the first sod roll from a rear of the sod harvester;

wherein the squeeze member is configured to counter a downward pressure exerted by the sod carrier on the group of sod rolls; and wherein the squeeze member contacts and applies a force to the first sod roll, and wherein the force being applied by the squeeze member onto the first sod roll is in a second direction that is opposite to the first direction.

2. The sod harvester of claim 1, wherein the second leg has a length, wherein the sod roll has a center, and wherein the length of the second leg is configured to position the squeeze member in the center of the sod roll when the accumulator squeeze device is in an up position.

3. The sod harvester of claim 1, wherein the third leg has a length relative to a length of the first leg, and wherein the length of the third leg relative to the length of the first leg is configured to squeeze the sod roll when the accumulator squeeze device is in an up position.

* * * * *